US006740389B2

(12) United States Patent
Yu

(10) Patent No.: US 6,740,389 B2

(45) Date of Patent: May 25, 2004

(54) CELLULAR STRUCTURE WITH INTERNAL LIMITING MEMBER AND METHOD FOR MAKING THE CELLULAR STRUCTURE

(75) Inventor: Fu-Lai Yu, Taipei Heien (TW)

(73) Assignee: Teh Yor Industrial Co., Ltd. (TW)

(*) Notice: Subject to any disclaimer, the term of this patent is extended or adjusted under 35 U.S.C. 154(b) by 0 days.

(21) Appl. No.: 10/269,436

(22) Filed: Oct. 11, 2002

(65) Prior Publication Data

US 2004/0071930 A1 Apr. 15, 2004

(51) Int. Cl.[7] .................................................. B32B 3/12

(52) U.S. Cl. .......................... 428/116; 428/12; 428/188; 160/84.05; 160/348

(58) Field of Search ................................ 428/116, 118, 428/12, 73, 188; 156/182, 197; 493/966; 160/348, 89.05

(56) References Cited

U.S. PATENT DOCUMENTS

| | | | | |
|---|---|---|---|---|
| 1,827,718 A | | 10/1931 | Whitney | |
| 2,201,356 A | | 5/1940 | Terrell | 156/16 |
| 3,055,419 A | | 9/1962 | Rubin et al. | 160/84 |
| 4,019,554 A | | 4/1977 | Rasmussen | 160/84 R |
| 4,288,485 A | | 9/1981 | Suominen | 428/116 |
| 4,307,768 A | | 12/1981 | Anderson | 160/84 R |
| 4,347,887 A | | 9/1982 | Brown | 160/368 R |
| RE31,129 E | | 1/1983 | Rasmussen | 156/193 |
| 4,388,354 A | | 6/1983 | Suominen | 428/12 |
| 4,450,027 A | | 5/1984 | Colson | 156/193 |
| 4,631,108 A | | 12/1986 | Colson | 156/461 |
| 4,631,217 A | | 12/1986 | Anderson | 428/118 |
| 4,676,855 A | | 6/1987 | Anderson | 156/200 |
| 4,677,012 A | | 6/1987 | Anderson | 428/116 |
| 4,677,013 A | | 6/1987 | Anderson | 428/116 |
| 4,685,986 A | | 8/1987 | Anderson | 156/167 |
| 4,732,630 A | | 3/1988 | Schnebly | 156/64 |
| 4,795,515 A | | 1/1989 | Kao et al. | 156/197 |
| 4,849,039 A | | 7/1989 | Colson et al. | 156/197 |
| 4,871,006 A | | 10/1989 | Kao et al. | 160/84.1 |
| 4,885,190 A | | 12/1989 | Schnebly | 427/207.1 |
| 4,984,617 A | | 1/1991 | Corey | 160/84.1 |
| 5,002,628 A | | 3/1991 | Schnebly | 156/379 |
| 5,015,317 A | | 5/1991 | Corey et al. | 156/197 |
| 5,043,039 A | | 8/1991 | Swiszcz | 156/197 |
| 5,097,884 A | | 3/1992 | Sevcik et al. | 160/84.1 |
| 5,106,444 A | | 4/1992 | Corey et al. | 156/197 |
| 5,129,440 A | * | 7/1992 | Colson | |
| 5,160,563 A | | 11/1992 | Kutchmarek et al. | 156/204 |
| 5,193,601 A | | 3/1993 | Corey et al. | 160/84.1 |
| 5,228,936 A | | 7/1993 | Goodhue | 156/260 |
| 5,482,750 A | | 1/1996 | Colson et al. | 428/12 |
| 5,525,395 A | | 6/1996 | Huang | 428/116 |
| 5,601,885 A | | 2/1997 | Akins | 428/12 |
| 5,630,900 A | | 5/1997 | Huang | 156/227 |

(List continued on next page.)

FOREIGN PATENT DOCUMENTS

| | | |
|---|---|---|
| DE | 28 40 023 A1 | 3/1980 |
| EP | 0 220 924 | 5/1987 |
| EP | 0 380 271 | 8/1990 |
| EP | 0 427 477 A2 | 5/1991 |
| EP | 0 455 911 A1 | 11/1991 |
| GB | 2 236 551 A | 4/1991 |

*Primary Examiner*—Deborah Jones
*Assistant Examiner*—Wendy Boss
(74) *Attorney, Agent, or Firm*—Olson & Hierl, Ltd.

(57) ABSTRACT

The present invention relates to a cellular structure for use in honeycomb window shades having plurality of rows forming a single column of double cells, which forms a uniformly pleated appearance for the face and rear of the cellular structure. Each of the plurality of rows of double cells is constructed of a longitudinal strip of material having a greater width portion and a limiting member portion. The limiting member portion serves to restrict the extent to which any row may be stretched. The present invention further relates to a method for making the cellular structure.

3 Claims, 2 Drawing Sheets

U.S. PATENT DOCUMENTS

| | | | | |
|---|---|---|---|---|
| 5,670,000 | A | 9/1997 | Colson et al. | 156/197 |
| 5,691,031 | A | 11/1997 | Swiszcz et al. | 428/116 |
| 5,702,552 | A | 12/1997 | Kutchmarek et al. | 156/197 |
| 5,834,090 | A | 11/1998 | Huang | 428/116 |
| 5,837,084 | A | 11/1998 | Barss | 156/197 |
| 5,974,763 | A | 11/1999 | Colson et al. | 52/793.1 |
| 6,052,966 | A | 4/2000 | Colson et al. | 52/793.1 |
| 6,066,382 | A | 5/2000 | Swiszcz et al. | 428/116 |
| 6,302,982 | B1 | 10/2001 | Corey et al. | 156/73.4 |
| 6,319,586 | B1 | 11/2001 | Colson | 428/116 |
| 6,345,486 | B1 | 2/2002 | Colson et al. | 52/793.1 |
| 6,377,384 | B2 | 4/2002 | Corey et al. | 359/227 |

* cited by examiner

CELLULAR STRUCTURE WITH INTERNAL LIMITING MEMBER AND METHOD FOR MAKING THE CELLULAR STRUCTURE

TECHNICAL FIELD OF THE INVENTION

The present invention relates to an expandable cellular structure such as used in honeycomb window shades, having a plurality rows of double cells.

BACKGROUND OF THE INVENTION

Expandable cellular structures that can be used as honeycomb window shades consisting of a plurality of elongated tubular cells are well known in the art. Honeycomb window shades provide consumers with numerous advantages in window coverings such as improved insulation, light filtering, and aesthetic appeal. The present invention relates to cellular structures and a method for making the cellular structures that utilizes a novel system of cutting, folding, gluing and arranging strips of fabric material in the construction of honeycomb panels.

Many cellular structures used in honeycomb window shades have pleats extending along the length of each cell, which are created by creasing the material during construction of the cellular structure. The pleats assist in the orderly collapsing of individual cells as the structure is compressed. The pleats also result in the face and rear of the structure having a corrugated appearance which is similar to that of an accordion.

One shortcoming experienced with standard honeycomb shade constructions that results in an undesired aesthetic appearance is due to the way honeycomb shades achieve their shape. As stated, honeycomb blinds are comprised of creased and folded lengths of material. The folded lengths of material have a spring coefficient that prevents the folded material from completely stretching out, and thereby maintaining the pleated or honeycombed appearance.

Because the structural integrity of the honeycomb structure is based on the spring coefficient of the material, however, the overall appearance of a conventional honeycomb panel is affected by the varying amount of weight supported by any particular cell of the honeycomb panel. Cells of the honeycomb panel that are located towards the top of the shade must support the weight of all the material below it and are stretched much more than cells located towards the bottom of the shade, which have less weight to support. As such, the predominance of the pleats emanating from those cells towards the top of the structure will gradually diminish as the amount of weight being supported by each cell increases. Thus, the cellular structure will fail to provide a uniformly distributed pleated appearance. The top cells will appear almost flat while the bottom cells will remain substantially pleated. The result of this is an uneven appearance and uneven shading ability of the blind. Over time, the cells towards the top of a shade may also be stretched such that the material loses its ability to retain a creased or pleated appearance.

The inability of a typical honeycomb cellular structure to limit the extent particular cells may be stretched also results in a waste of material. This is because with conventional honeycomb constructions a balance must be achieved with the cellular structure such that cells towards the top of the shade are not overly distorted while still allowing cells towards the bottom of the shade to extend sufficiently to provide a desirable aesthetic appearance. Often, a compromise is made such that honeycomb cells towards the bottom of a shade are not fully extended by a heavier weight to prevent cells at the top of the shade from being too stretched out. As a result, more material will be needed to cover a window space than would be necessary if cells at the bottom of the shade could be fully extended.

Various attempts have been made in the past to overcome such problems. U.S. Pat. Nos. 5,670,000 and 5,482,750 are examples of earlier attempts. In these patents, a cellular structure is created with a plurality of rows made from single strips of material wherein the strips of material form alternatingly staggered pleated cells when the shade is fully extended. Each strip of material forms one cell and a substantial portion of another cell. The strips of material of adjacent rows are used to complete the staggered cells. This staggered appearance, however, may not be desirable since pleats on the face and the back of the window shade will not be even. This shortcoming is recognized in U.S. Pat. No. 5,670,000 and is addressed by the creation of cellular structures with three or more columns of cells. Such an approach, however, is complicated and requires additional material to construct the additional columns of cells, which increases costs.

Accordingly, what is needed is a cellular structure as used in a honeycomb window shade that maintains its pleated appearance from top to bottom when it is fully extended that does not have an alternatingly staggered pleated appearance, and that does not require three or more columns of cells to achieve the desired appearance. The desired cellular structure should also enable all the cells to be fully and evenly extended, thereby providing a uniform appearance without the shortcomings of typical honeycomb blind structures. The present invention meets these desires.

SUMMARY OF THE INVENTION

The present invention relates to a cellular structure having a face and a rear such as used in honeycomb window shades, and having plurality of rows forming a single column of double cells, which forms a uniformly pleated appearance for the face and rear of the cellular structure. As will be discussed below, the face and rear are preferably constructed to be symmetrical when viewed. Reference herein to the face and the rear of the cellular structure are merely for sake of description. The cells in each of the rows will be both parallel to each other and will also be laterally even such that the cells on the face and back of the cellular structure will not be staggered. The structure of the present invention also includes a part that limits the extent to which any row or cell can be extended. As such, each cell when viewed will have a uniform shape and size when the shade is fully extended. The present invention further relates to a method for making the cellular structure.

The cellular structure of the present invention is made up of a single column of a plurality of longitudinally extending rows of double cells. Each of the rows has a front cell and a back cell, which are described in further detail below. It is preferred that the outward appearance of the front and back cells are substantially the same.

Each of the plurality of rows of double cells is preferably constructed of a single longitudinal strip of material having a first surface and a second surface. The strip of material further includes a greater width portion and a limiting member portion. The limiting member portion is secured at a first end of the limiting member portion to the first surface of the strip on the greater width portion. Preferably, the first surface of the strip on the limiting member portion is secured to the first surface of the strip on the greater width portion by a first longitudinal glue line. As such, the limiting member portion forms a portion of both the front and back cells of a row. In other words, the front cell and the back cell share this limiting member portion which forms a common wall. The greater width portion of the strip substantially completes both the front cell and back cell. It is this greater width portion that will be visible on the face and rear of the cellular structure.

It is preferable for aesthetic reasons that the greater width portion of the strip of each row comprises at least a pair of creases defining pleats. The pleats will be located so that when the row is constructed, one pleat will be positioned at the front cell and a second pleat will be positioned at the back cell, and such that the outward appearance of the front and back cell is substantially the same.

The limiting member portion also acts to limit the extent to which the rows may be stretched. This is because the limiting member portion is shorter than either section of the greater width portion forming the front or back cells. For example, if the limiting member portion of the strip of material is of a width less than one-half the total width of the greater width portion, then the sections of the greater width portion forming the part of the dual cells will not be able to be fully extended before the limiting member portion is fully stretched. As such, the face and rear of the cellular structure, when fully extended, will have uniformly formed pleats from the top of the cellular structure to the bottom. Also, the resulting single column of double cells will be such that for each row the front cell and the back cell will be longitudinally parallel and laterally even. In other words, the cells will not be alternatingly staggered.

It is further preferred for ease of manufacturing that the limiting member portion is positioned such that the front cell is larger than the back cell. To create a balanced overall cellular structure, the rows are then alternatingly stacked so the cellular structure will have alternating rows of both front and back cells for the face and rear, thereby maintaining the balance of the overall cellular structure.

Each of the plurality of rows is also secured to at least one other similarly formed row with at least a second glue line. This second glue line is formed on the second surface of the strip at a second end of the first limiting member portion. Preferably, a third glue line is also applied on the second surface of the strip at a first end of the first greater width portion to further secure the row to a second row.

In order to manufacture the cellular structure, a plurality of rows are formed, and are then stacked and secured to adjacent rows. Each row is formed by taking a longitudinal strip of material and securing the limiting member portion to the first surface of the strip on the greater width portion. Preferably, a glue line is applied to the first surface of the strip on the greater width portion, and the limiting member portion is folded over such that a first end of the limiting member portion is secured to the glue line. In so doing, one cell of the double cell row is formed. For sake of description, this is referred to herein as the back cell.

As additional rows are constructed, they are stacked to form the cellular structure. It is preferred that when the rows are stacked that the front to back orientation of the rows be alternated.

The stacked rows can then be taken to a curing station to set the adhesive bonding of the rows and ends of the strips of material. A head rail, bottom rail, and any other hardware can also be secured to the cellular structure in any manner known in the art.

Other features and advantages of the present invention will become readily apparent from the following detailed description, the appended drawings, and the accompanying claims.

DESCRIPTION OF THE PREFERRED EMBODIMENT OF THE INVENTION

Figure 1:
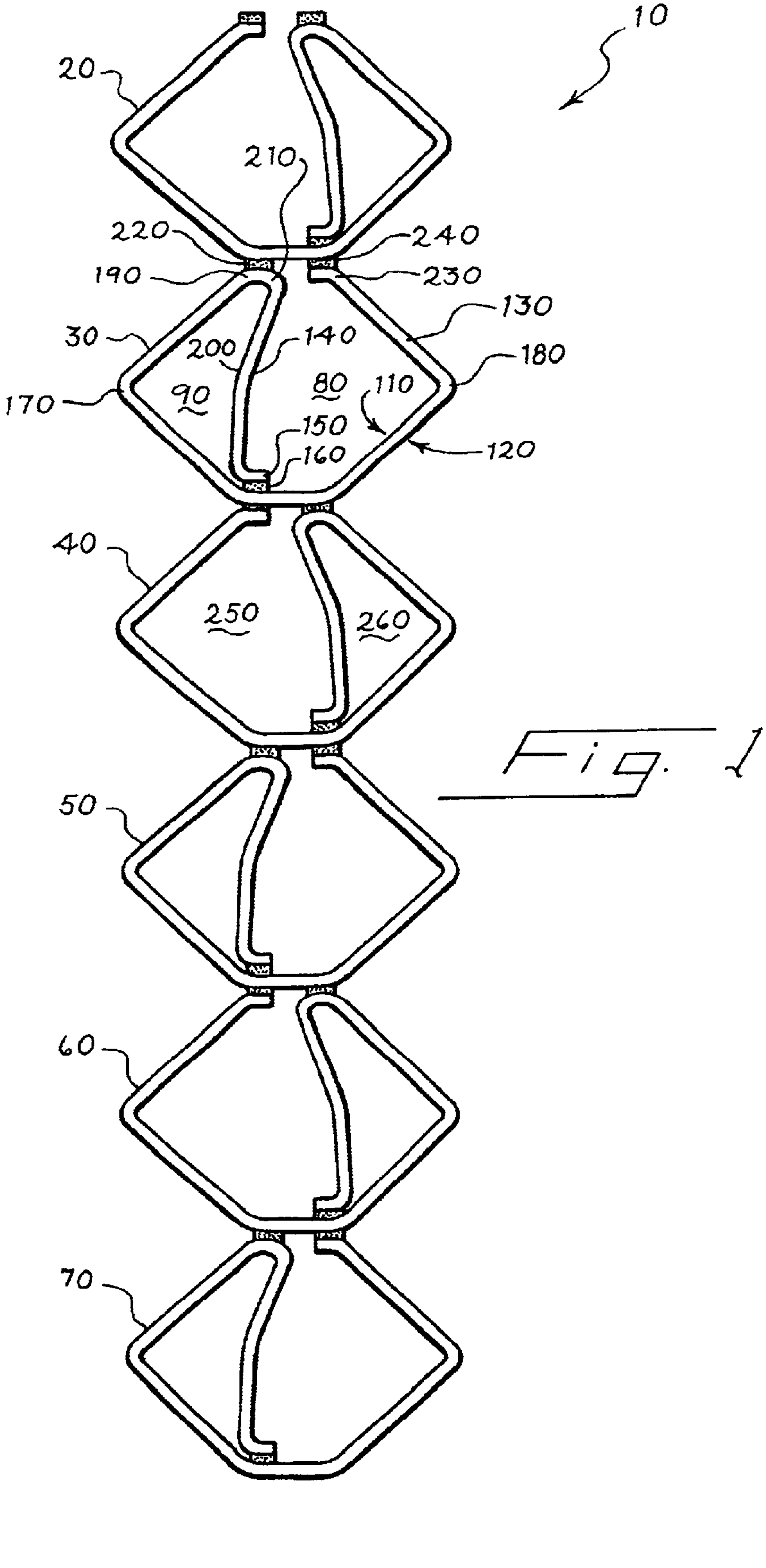
FIG. 1 is a foreshortened cross sectional schematic view of a fully opened embodiment of a honeycomb panel.

The invention disclosed herein is, of course, susceptible of being embodied or conducted in many different manners. Shown in the drawings and described herein below in detail is a preferred embodiment of the invention. It is to be understood, however, that the present disclosure is an exemplification of the principles of the invention and does not limit the invention to the illustrated embodiment.

Moreover, it is understood that the figures herein do not necessarily show details of the cellular structure made according to the present invention that are known in the art and that will be recognized by those skilled in the art as such. The detailed descriptions of such steps or elements such as the structure of the apparatus for cutting the shade material, the attachment of head rails and bottom rails, the curing process for adhesives that may be used, or the stacking apparatus are not necessary to an understanding of the invention. Accordingly, such steps or elements are not depicted herein.

Shown in FIG. 1 is an embodiment of a foreshortened cross-section of an expanded cellular structure 10 according to the present invention. The cellular structure 10 is comprised of a plurality of dual cell rows 20, 30, 40, 50, 60, 70. Row 30 will be used as an example to describe the construction of each cell. Row 30 comprises two cells, a front cell 80 and a back cell 90. Row 30 is constructed of a single longitudinal strip of material 100 having a first surface 110 and a second surface 120. The strip 100 further includes a greater width portion 130 and a limiting member portion 140. The limiting member portion 140 is secured by a first end 150 of the limiting member portion 140 to the first surface 110 of the strip 100 on the greater width portion 130. Preferably, the first surface 110 of the strip 100 on the limiting member portion 140 is secured to the first surface 110 of the strip 100 on the greater width portion 130 by a first attachment line such as first longitudinal glue line 160. As shown, this limiting member portion 140 is shared by and forms a portion of both the front cell 80 and the back cell 90. The greater width portion 130 of the strip 100 forms the rest of both the front cell 80 and back cell 90.

To complete the front cell 80, there are a number of possible methods. One that is not shown is to secure an end 230 of the greater width portion 130 of the strip 100 to the strip 100 near a second end 190 of the limiting member portion 140. It is preferred however, as shown in FIG. 1, that the end 230 of the greater width portion 130 may be secured to the adjacent row 20 to which the second end 190 of the limiting member portion 140 is also secured. Glue line 240 is also applied to the second surface 120 of the strip 100 on the end 230 of the greater width portion 130, and this glue line 240 is secured to the second surface of an adjacent row 20.

The width of the limiting member portion 140 is discretionary and depends only on the amount of stretch desired for the cellular structure 10. In other words, depending on the size and shape desired for the front and back cells such as 80 and 90, respectively, the size of the limiting width portion 140 can be shortened or lengthened accordingly.

The strip of material 100 has thus far been described as a single strip of material having a limiting member portion 140 and a greater width portion 130. It is contemplated that the strip of material 100 may be comprised of a plurality of strips of material. For example, in one embodiment, which is not shown, the limiting member portion may be a separate strip of material from greater width portion, whereby the ends of the limiting member portion and the greater width portion are secured together. It is preferred, however, that each row be comprised of a single strip of material.

It is preferable that the greater width portion 130 of strip 100 comprises at least a pair of creases which are visible as pleats 170 and 180. The pleats 170 and 180 will be located so that when row 30 is constructed, one pleat 180 will be positioned at the front cell 80 and a second pleat 170 will be positioned at the back cell 90, and such that the outward appearance of the front cell 80 and back cell 90 is substantially the same. It is further preferred that a crease 190 be formed at approximately a second end 210 of the limiting member portion 140. The limiting member portion 140 preferably also has another crease 200.

Placed near the second end 210 of limiting portion 140 is a second attachment line such as second longitudinal glue line 220 which secures row 30 to adjacent row 20. Placed at an end 230 of the greater width portion 130 is a third attachment line such as third longitudinal glue line 240, which also secures row 30 to adjacent row 20.

As shown, the orientation of the front cell 80 and back cell 90 in row 30 is opposite to the orientation of the front cell 250 and back cell 260 in row 40. This alternatingly stacked arrangement of rows 20, 30, 40, 50, 60, and 70 and their respective front and back cells is repeated over the entire cellular structure.

Figure 2:
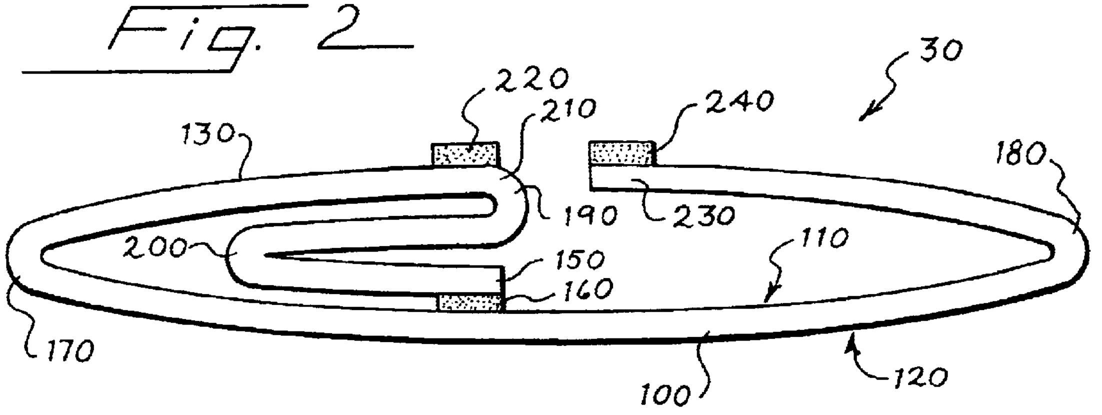
FIG. 2 is a cross sectional schematic view of one row of a honeycomb panel.

Shown in FIG. 2 is a cross-sectional schematic of single row 30 in an unexpanded condition prior to its attachment to other similarly constructed cells. As discussed, a plurality of rows constructed like row 30 are stacked and secured to one another to form the overall cellular structure 10. Several folds or creases are preferably made in strip 100. A first crease 190 is made between limiting member portion 140 and greater width portion 130. Limiting portion 140 preferable includes another crease 200. Crease 200 is preferably formed at approximately the mid-point between the first end 150 of limiting member portion 140 and crease 190, which also approximates the location of a second end 210 of the limiting member portion. Greater width portion 130 also preferably includes a pair of creases 170 and 180. Limiting width portion 140 is less than half the total width of greater width portion 130. Preferably, limiting width portion 140 is between one-quarter to one-third the total width of greater width portion 130.

It is preferred that the various creases are made prior to placing the glue lines. After the creases are made, a glue line 160 is placed on first surface 110 of the strip 100 on the greater width portion 130. The section of strip 100 including the limiting member portion 140 is then folded over and secured to the first surface 110 of the strip 100 on the greater width portion 130. Preferably, limiting member portion 140 is secured to the first surface 110 of the strip 100 on the greater width portion 130 on the first surface 110 of the strip at end 150 of the limiting member portion 140. Glue lines 220 and 240 are then laid at locations near crease 190, which preferably also defines a second end 210 to the limiting member portion 140, and an end 230 of the greater width portion 130, respectively. Completed row 30 can then be stacked with similarly formed rows, such as shown in FIG. 3.

Figure 3:
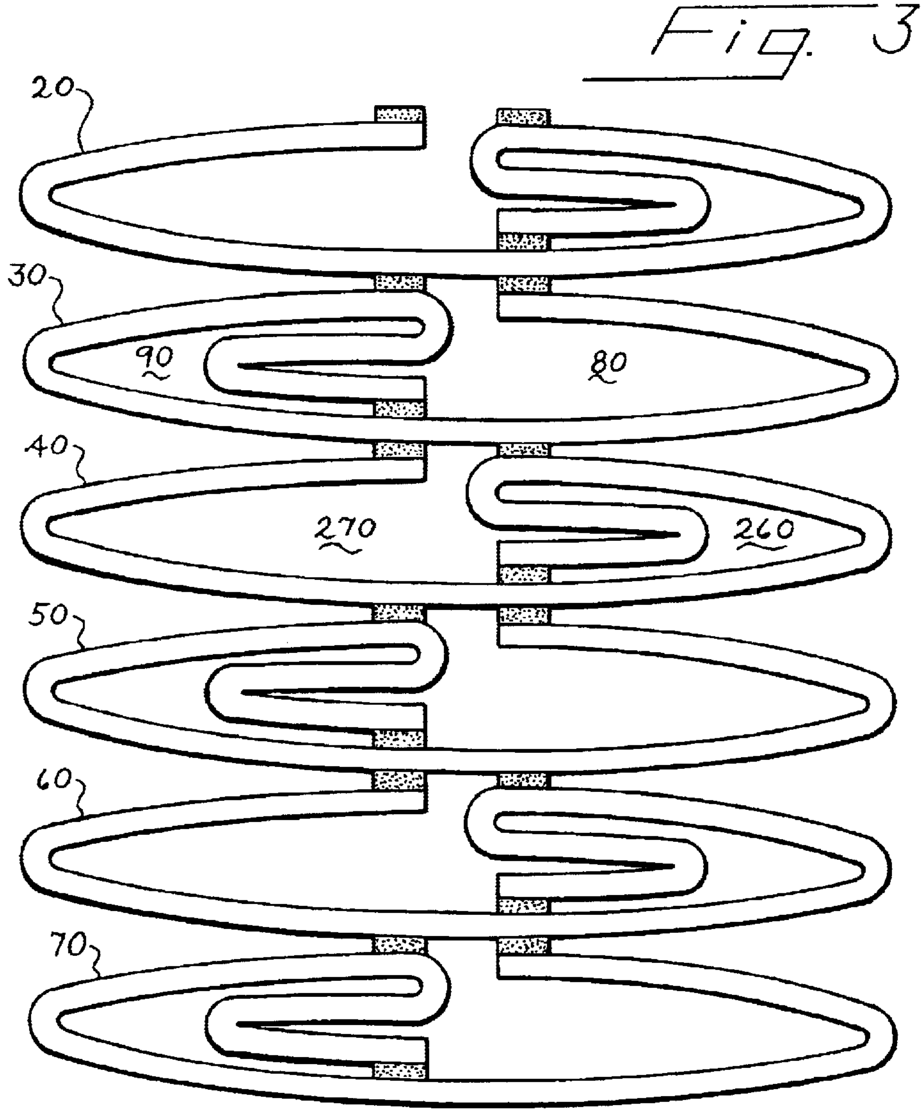
FIG. 3 is a cross sectional schematic view of an unexpanded embodiment of a honeycomb panel.

Referring to FIG. 3, row 30 is stacked with other rows 20, 40, 50, 60 and 70. Depending on the desired size of the cellular structure, fewer or more rows will be stacked together. As discussed above, it is preferred that the orientation of the completed rows be alternated such that the front cells and back cells alternate. For example, with respect to rows 30 and 40, front cell 80 and front cell 250 alternate. Likewise, back cell 90 and back cell 260 alternate.

After the desired number of rows are added, cellular structure 10 is taken to a curing station (not shown) to permanently join together the material connected by glue lines. Although the manner in which pieces of material and rows are secured together discussed thus far has been with glue lines, securing the different fabric materials and completed rows together may be accomplished by any means known in the art. Examples of such techniques includes bonding with glue or adhesive, ultrasonic welding, and knitting. After curing, head rails, bottom rails and any other additional hardware can be added.

What is claimed is:

1. A cellular structure for use in a honeycomb window shade, the cellular structure comprising:

a single column of a plurality of longitudinally extending rows of double cells, the plurality of rows comprising at least a first row and a second row, the first row including a front cell and a back cell, the front cell being larger than the back cell and further comprising:

a strip of material having a first surface and a second surface, the strip of material comprising a first greater width portion and a first limiting member portion, a first longitudinal glue line on the first surface of the strip at a first end of the first limiting member portion, the first glue line securing the first end of the first limiting member portion to the first surface of the strip on the first greater width portion, the front cell formed by the first limiting member portion and a first section of the first greater width, the back cell formed by the first limiting member portion and a second section of the first greater width, a second longitudinal glue line on the second surface of the strip at a second end of the first limiting member portion, the second glue line securing the second surface of the strip to the second row, a third longitudinal glue line on the second surface of the strip at a first end of the first greater width portion, the third glue line further securing the strip to the second row;

the second row constructed as the first row;

the first row secured to the second row with the second glue line and third glue line at the second surface of the strip of the second row on the second greater width portion; and wherein a face of the cellular structure is comprised of the plurality of rows which are stacked such that the front cells and back cells alternate.

2. A cellular structure for use in a honeycomb window shade having a face and a rear, the cellular structure comprising:

a column of a plurality of longitudinally extending rows of double cells including a front cell and a back cell, each of the rows comprising a strip of material having a greater width portion and a limiting member portion, the limiting member portion is secured to the greater width portion at a first end of the limiting member portion, the limiting member portion forming an interior portion of the row and portions of the front cell and the back cell, the greater width portion also forming portions of the front cell and back cell, the limiting member portion restricting the extent that each of the rows can be extended;

a first row of the plurality of rows is secured to a second row of the plurality of rows along at least one longitudinally extending line provided substantially at a second end of the limiting member portion; and the greater width portion of the plurality of rows forming the face and rear of the cellular structure, wherein the face of the cellular structure is comprised of the plurality of rows which are stacked such that the face is comprised of front cells and back cells.

3. A cellular structure for use in a honeycomb window shade having a face and a rear, the cellular structure comprising:

a single column of a plurality of longitudinally extending rows of double cells including a front cell and a back cell, each of the rows comprising a strip of material having a first surface and a second surface, the strip of material comprising a greater width portion and a limiting member portion, the limiting member portion is secured to the greater width portion at a first end of the limiting member portion on the first surface of the strip, the limiting member portion forming part of the front cell and the back cell, the greater width portion also forming part of the front cell and back cell;

a first row of the plurality of rows is secured to a second row of the plurality of rows along at least one longitudinally extending line provided substantially at a second end of the limiting member portion; and wherein the face of the cellular structure is comprised of the plurality of rows which are stacked such that the face is comprised of front cells and back cells.

* * * * *